April 19, 1960 Z. H. HELLER ET AL 2,933,598

AUTOMATIC FREQUENCY CONTROL CIRCUIT

Filed March 28, 1956 2 Sheets-Sheet 1

INVENTORS
ZINDEL H. HELLER
JOSEPH J. DUDEK
BY
ATTORNEY

April 19, 1960 Z. H. HELLER ET AL 2,933,598

AUTOMATIC FREQUENCY CONTROL CIRCUIT

Filed March 28, 1956 2 Sheets-Sheet 2

INVENTORS
ZINDEL H. HELLER
JOSEPH J. DUDEK
BY
[signature]
ATTORNEY 2,933,598

AUTOMATIC FREQUENCY CONTROL CIRCUIT

Zindel H. Heller, Plainview, and Joseph J. Dudek, Jackson Heights, N.Y., assignors to Sperry Rand Corporation, a corporation of Delaware Application March 28, 1956, Serial No. 574,400

5 Claims. (Cl. 250—20)

Figure 1:
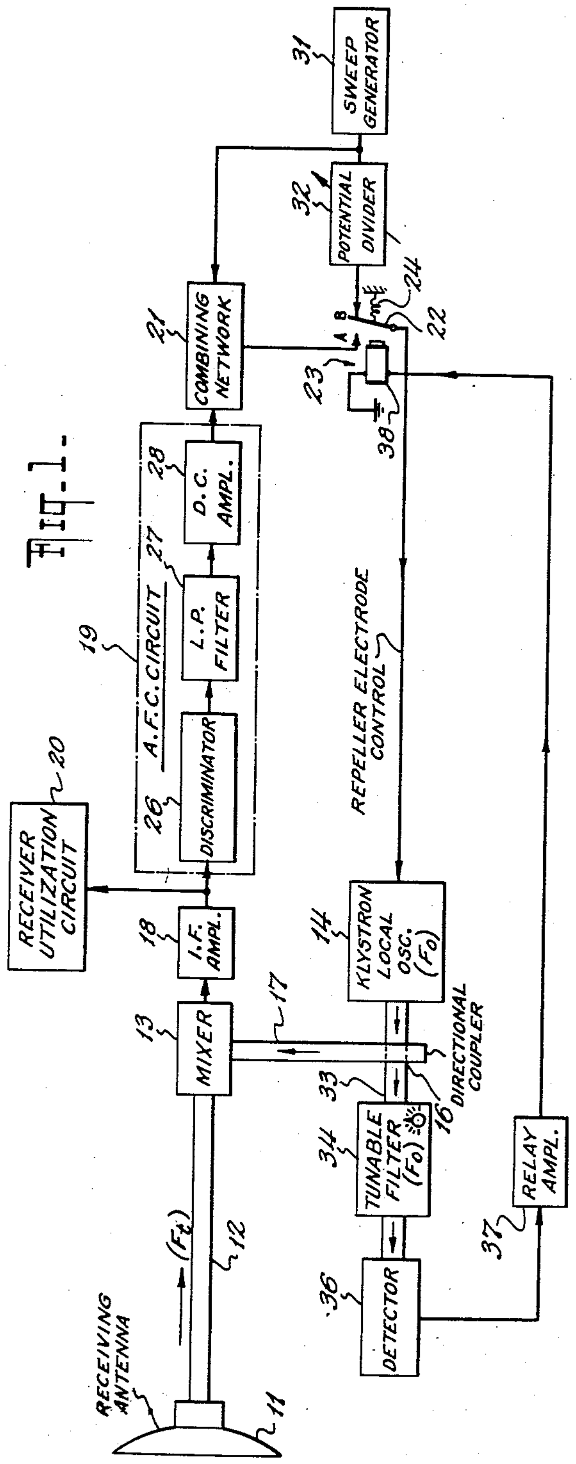

The present invention relates to a novel A.F.C. (automatic frequency control) circuit which is particularly useful in a radio wave receiver required to discriminate between a plurality of closely spaced incoming carrier wave frequency signals.

In receivers heretofore known in the art which employ conventional A.F.C. circuits, it is possible for the receiver local oscillator to lock on to an undesired incoming carrier frequency signal when the local oscillator frequency is subject to extreme variations such as occurs during its warm up. Frequency changes may also occur when the local oscillator is subjected to changes in pressure or temperature or when voltage surges occur on the power line for the oscillator. Changes as aforedescribed might cause unlocking of the local oscillator with a desired carrier wave or cause the oscillator to be locked with a carrier wave of undesired frequency. Furthermore, when a desired incoming carrier wave signal is subject to fading or interruption, the local oscillator of a conventional A.F.C. system might lock on to a stronger but undesired carrier wave signal at a different frequency. This is especially possible when a plurality of carrier wave signals at frequencies close to that of a desired carrier wave signal are on the air. Also, if the local oscillator were employed as a transmitter in a relay or repeater station, conditions as aforedescribed might cause it to transmit out of an allotted frequency band therefor.

Thus, it is an object of the present invention to provide an A.F.C. circuit for a receiver local oscillator to ensure that the local oscillator will only lock on to a desired one of a plurality of closely spaced carrier wave frequency signals and permit the local oscillator to follow slight drifts in frequency of the desired carrier wave signal.

It is yet another object of the present invention to provide an automatic frequency control system which precludes the frequency of a local oscillator from being locked on the wrong side of a desired incoming carrier wave frequency signal of predetermined frequency.

It is a further object of the present invention to provide an A.F.C. circuit as aforedescribed for an F.M. (frequency modulation) receiver of the type whose local oscillator also comprises a transmitter, said circuit being arranged to control the frequency of the local oscillator so that it will not transmit in an undesired frequency band.

The foregoing and other objects and advantages of the present invention are attained for a receiver having a local oscillator and A.F.C. circuit therefor by employing relay means for decoupling the A.F.C. circuit from the local oscillator when it is not operating within a predetermined frequency band required for mixing with a received carrier wave signal at a predetermined frequency for providing a desired I.F. (intermediate frequency). When the local oscillator is operating within the proper frequency band, output energy from a filter tuned to a predetermined local oscillator frequency and coupled to the local oscillator output regulates a relay for coupling of the A.F.C. circuit to the local oscillator so that automatic frequency control of the local oscillator in a proper frequency range for attaining a predetermined intermediate frequency is provided.

Figure 2:
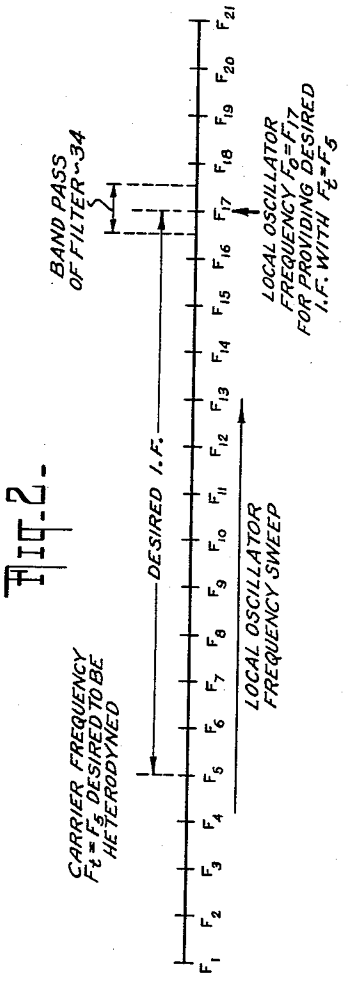
Figure 3:
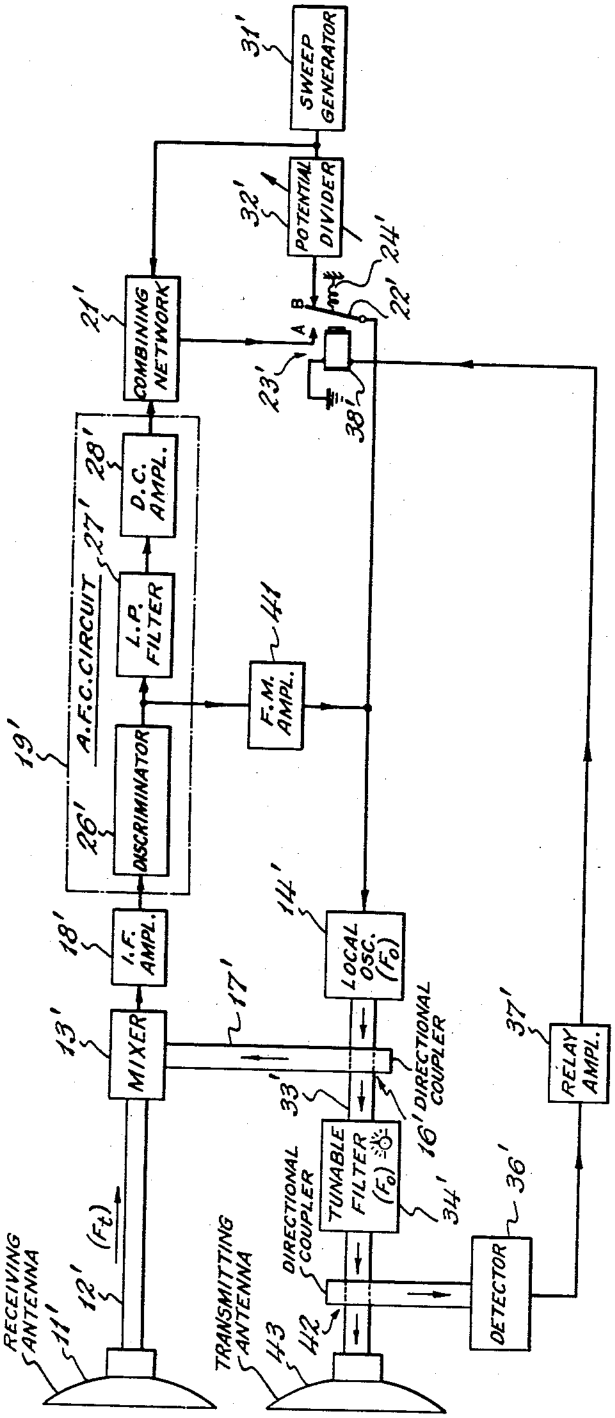

Referring now to the drawings,

Fig. 1 is a schematic diagram of a portion of a superheterodyne radio wave receiver system including an A.F.C. circuit for frequency control of a local oscillator;

Fig. 2 comprises an explanatory diagram for describing the operation of the system shown in Fig. 1; and Fig. 3 is a schematic block diagram of an embodiment of the present invention as utilized in a repeater or relay station.

Referring to Fig. 1, 11 designates an antenna for receiving radio wave energy at any carrier frequency $F_t$ within a spectrum of closely spaced frequencies which might be simultaneously received by antenna 11, for example. The energy received by antenna 11 might comprise pulse or frequency modulated energy and is supplied by means such as an electromagnetic wave guide 12 to a mixer 13 for heterodyning with energy of a different frequency provided by a local oscillator 14.

The local oscillator 14 comprises a 2K25 klystron, for example, for generating oscillations at a frequency $F_{17}$ as shown in Fig. 2 separated from and above a certain desired carrier wave frequency $F_5$ by a predetermined intermediate frequency. The output of the local oscillator 14 is supplied to the mixer 13 by means of a directional coupler 16 and a wave guide 17. The frequency $F_5$ might be 9030 mc. (megacycles/sec.) and the frequency $F_{17}$ might be 9090 mc., for example, so that the I.F. frequency is equal to 60 mc. The spacing between adjacent frequencies indicated in Fig. 2 might be 5 mc., for example, it being understood that the foregoing frequency values are given only for illustrative purposes.

The output of the mixer 13 is supplied to an I.F. amplifier 18 whose center frequency corresponds to the desired intermediate frequency of 60 mc., for example. The output of amplifier 18 is supplied to a receiver utilization circuit 20 suitable for detecting the modulation intelligence carried by the received wave of carrier frequency $F_5$.

The output of amplifier 18 is also supplied to an A.F.C. circuit 19 which feeds back an automatic frequency control voltage to the repeller electrode of klystron 14 through a voltage combining network 21 and a switch arm 22 of a relay 23 whenever relay 23 is energized and switch arm 22 is in contact with a relay terminal A. Biasing means such as a spring 24 holds switch arm 22 in contact with a relay terminal B when the relay 23 is unenergized.

The A.F.C. circuit 19 comprises a frequency discriminator 26, a low pass filter 27, and a D.C. amplifier 28 whose output is supplied to combining network 21 for voltage addition with a further voltage supplied to network 21 from a sweep generator 31. The crossover frequency of discriminator 26 should correspond to the center frequency of the I.F. amplifier 18 with the output from the discriminator 26 on either side of its crossover frequency being in the proper sense so that the output of the A.F.C. circuit 19 will supply an A.F.C. voltage to the repeller electrode of klystron 14 in the proper sense for regulation of the local oscillator frequency above a desired carrier wave frequency $F_5$, for example, so as to provide a substantially constant intermediate frequency of desired value.

The low pass filter 27 of the A.F.C. circuit 19 is coupled to the output of discriminator 26 for supplying a D.-C. discriminator voltage to amplifier 28 without passing any frequency modulation signal which might be present at the discriminator output if a frequency modulated carrier wave is received by the system. The design of the A.F.C. circuit 19 should be chosen so as to insert a substantial amount of gain for the frequency control voltage supplied back to the repeller electrode of klystron 14 without causing instability.

The sweep generator 31 is provided for supplying a sawtooth scanning voltage through a potential divider 32 to relay terminal B for electronically tuning or scanning the frequency of the klystron local oscillator over a wide frequency range of approximately 60 mc., for example, when switch arm 22 contacts the terminal B. The frequency of the scanning voltage should be low enough so that ample time exists for all of the system components to operate. The output of the sweep generator is further supplied to the combining network 21 so that a scanning voltage component also occurs at relay terminal A.

The potential divider 32 should be adjusted so that the sweep voltage components at terminals A and B are equal. Thus, the frequency of local oscillator 14 will not be disturbed under the condition of zero discriminator output when the switch arm 22 switches from terminal A to terminal B. In some systems, the potential divider 32 might be between the generator 31 and combining network 21 rather in the position shown in Fig. 1.

A further output from the local oscillator 14 is derived from directional coupler 16 and supplied by wave guide 33 to a tunable filter 34 such as a cavity resonator. The filter 34 is adapted to pass microwave energy over a narrow band of frequencies such as 4 mc., for example, when the spacing between the most adjacent carrier wave frequencies expected to be received is 5 mc. or larger. The mid-band frequency of filter 34 should correspond to a local oscillator frequency $F_0=F_{17}$, for example, spaced by 60 mc. from a desired carrier wave frequency $F_t=F_5$. A detector 36 terminates wave guide 33 for receiving the output of filter 34 and rectifying the energy therefrom for amplification by a relay amplifier 37. The output from the relay amplifier 37 is supplied to the relay 23 for energization of a relay coil 38 thereof and actuation of switch arm 22 so as to be in contact with the switch terminal A when local oscillator energy is being passed by filter 34 at the frequency $F_{17}$. The relay 23 should operate rapidly enough so that no appreciable drift or change in local oscillator frequency occurs during the switching interval.

In operation of the aforedescribed system, when the local oscillator 14 is first turned on and has not reached a steady state of operation, the frequency thereof will be highly unstable and not likely to be at the desired local oscillator frequency $F_{17}$. Thus, if filter 34 is tuned to $F_{17}$ there will be no output therefrom for energizing relay 23 so that the switch arm 22 will be in a position contacting the terminal B. Therefore, the A.F.C. circuit 19 and the local oscillator 14 are decoupled so that the frequency of the local oscillator 14 cannot be locked to any carried frequency signal at this time. When the switch arm 22 contacts terminal B, the output of the sweep generator 31 is supplied through the potential divider 32 to the repeller electrode of the klystron local oscillator 14 for electronic tuning of the local oscillator and scanning of its frequency for rapidly bringing the oscillations produced by the oscillator to the desired value of $F_{17}$.

When the output energy from the local oscillator is at a frequency $F_{17}$, the filter 34 will provide an output for energization of the relay coil 38 and actuation of the switch arm 22 for contact with the terminal A. At this time the coupling between the A.F.C. circuit 19 and the repeller electrode of klystron 14 is complete. As has been mentioned before, if the voltage divider 32 is properly adjusted the component of the sweep voltage from the sweep generator will be the same at terminal A as it was at terminal B (under conditions of zero output from discriminator 26) so that there will be no disturbance of the local oscillator frequency at the instant of operation of the relay 23.

The combining network 21 is provided for isolating the A.F.C. circuit 19 from generator 31, while applying both an error voltage component from the A.F.C. circuit 19 and a reference voltage component from generator 31 to the terminal A. The reference voltage component ensures that a proper potential is applied to the repeller electrode of oscillator 14 for sustaining oscillations at the frequency of filter 34 at the moment switch arm 22 is connected to terminal A. The reference voltage component also ensures that the klystron oscillator has a suitable voltage applied to its repeller electrode for sustaining oscillations when the error voltage component from circuit 19 is substantially zero. The error voltage component is substantially zero at the moment a predetermined mid-band intermediate frequency is produced in the system.

When switch arm 22 is connected so that the coupling of the A.F.C. circuit to oscillator 14 is complete and a carrier wave signal of frequency $F_5$ is received by antenna 11, a proper I.F. output is provided from mixer 13 and the A.F.C. circuit, through the operation of discriminator 26, locks the local oscillator for providing an I.F. signal of substantially constant frequency. This occurs regardless of any further warm up time for the oscillator, voltage surges on the power supply line of the oscillator or other factors which might influence the local oscillator frequency. The component of the scanning voltage at terminal A during A.F.C. will not have any appreciable effect on the local oscillator frequency if the gain of the A.F.C. circuit 19 is made sufficiently large so that an A.F.C. output voltage overrides the scanning voltage.

It can readily be seen that if the filter 34 is properly designed so as to have a pass band of less than twice the spacing between the adjacent ones of the frequencies indicated in Fig. 2, and the frequency $F_{17}$ is the center frequency of the filter 34, it is assured that the frequency of local oscillator 14 cannot be locked with any other except the carrier frequency $F_5$ since the coupling of the A.F.C. circuit 19 to the local oscillator 14 is complete only when the filter 34 provides an output. If the spacing between the adjacent frequencies were 5 mc. as mentioned before, the pass band of filter 34 could be 4 mc., for example.

It is further assured by the system that an image discriminator response which might result in some systems when received carrier wave energy of a desired frequency is heterodyned with local oscillator energy during the scanning time thereof at a lower frequency than the desired carrier wave frequency by the intermediate frequency utilized in the system, that the A.F.C. circuit 19 will have no effect on the oscillator 14. This occurs since no output from filter 34 is provided for local oscillator energy at such a frequency and the local oscillator will be decoupled from the A.F.C. circuit 19. In the event carrier wave energy at a high frequency above the local oscillator $F_{17}$ by the desired intermediate frequency might be received, a suitable wave guide filter might be provided between antenna 11 and mixer 13 for blocking carrier wave energy at and above a region including such a high frequency.

Sometimes it is desirable in a communications repeater system or in a continuous-wave F.M. radar system for range measurement to receive a frequency modulated signal at one carrier frequency and then transmit a frequency modulated signal of a slightly different carrier wave frequency which contains substantially the same frequency modulation intelligence as carried by the received carrier wave signal. A relay or repeater system including a receiver with A.F.C. regulation similar to that of Fig. 1 might be employed for such a purpose. Such a system is shown in Fig. 3, where the primed reference numerals designate similar components to the components designated by corresponding unprimed reference numerals in Fig. 1, the operation of such components being similar to that described with respect to Fig. 1.

If the system of Fig. 3 were employed in a radar system, for example, assume that a desired carrier wave signal at 9000 mc. is received by antenna 11', such a signal being frequency modulated by a constant amplitude A.-C. modulating signal of 400 kilocycles per second, for example, to produce a carrier frequency deviation of plus or minus one megacycle. The system shown in Fig. 3 might be aboard a reference aircraft while the transmitter for the 9000 mc. frequency modulated signal might be aboard a further aircraft to be guided by the reference aircraft.

The aforementioned carrier wave received by the system of Fig. 3 is heterodyned in mixer 13' with local oscillator energy of a frequency spaced 30 mc. above the aforementioned carrier wave energy, for example, the I.F. amplifier 18' and discriminator 26' being adjusted to 30 mc. A modulation component of the aforementioned 9000 mc. carrier wave signal is present at the output of the discriminator 26'. The foregoing modulation component is blocked by filter 27' from the D.C. amplifier 28' of the A.F.C. circuit 19' but is supplied to an A.-C. modulation amplifier 41 having gain at 400 kilocycles per second, for example.

The output of amplifier 41 is combined with the D.-C. A.F.C. voltage from the A.F.C. circuit 19' for supply to the repeller electrode of the klystron local oscillator 14'. Thus, the local oscillator energy is frequency modulated about a center frequency spaced by a constant intermediate frequency of 30 mc. from the received 9000 mc. carrier wave signal. The system should be adjusted so that the frequency modulation component at the output of the local oscillator 14' is in phase with and has a slightly smaller frequency deviation than the deviation of the frequency modulation present on the carrier wave signal received by the antenna 11'.

A portion of the frequency modulated local oscillator energy in wave guide 33' is passed by the filter 34' for transmission through a directional coupler 42 to a transmitting antenna 43, filter 34' passing the frequency modulated local oscillator energy. Thus, the output energy derived from antenna 43 of the system is frequency modulated by almost the same extent and in the same phase as the modulation component of the input energy supplied to antenna 11' and is retransmitted at a different carrier frequency. If the guided aircraft containing the 9000 mc. transmitter mentioned above further contains a receiver as shown in Fig. 1 for receiving the frequency modulated output energy from the system of Fig. 3, and the utilization circuit 20 in Fig. 1 includes a discriminator and a phase detector for comparing the phase of the frequency modulation upon the transmitted carrier wave of 9000 mc. from the guided aircraft with the phase of the modulation received by the guided aircraft from the relay of transponder of Fig. 2 upon a carrier wave of 9030 mc., the distance between such aircraft can be readily determined.

The operation of the A.F.C. circuit in Fig. 3 is a substantially the same as that of Fig. 1. Thus, not only is the local oscillator 14' precluded from locking on to received carrier wave energy at any frequency other than one in proximity with a predetermined carrier frequency, the transponder system of Fig. 3 including said local oscillator is prevented from reradiating energy with modulation intelligence thereon at any other than that within a desired frequency band.

Since many changes in the above construction could be made and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a mixer having two inputs and an output, a tunable reflex klystron local oscillator having a repeller electrode voltage supply lead, said oscillator being coupled to one of said mixer inputs for supplying said mixer with radio energy of a required frequency for heterodyning with carrier wave energy of a predetermined different frequency supplied to the other of said mixer inputs for providing a predetermined intermediate frequency output, a sweep generator voltage source for scanning the frequency of said local oscillator, a feedback circuit including a switch and automatic frequency control means coupled between said mixer output and said repeller electrode voltage supply lead of said local oscillator for regulating and locking the frequency thereof to maintain said predetermined intermediate frequency output from said mixer, said feedback circuit including a voltage combining network having one input connected to said automatic frequency control means and another input connected to said sweep generator voltage source, said switch having a first postion for completion of said feedback circuit through said voltage combining network and a second position for opening said feedback circuit, means including a band pass filter coupled to said local oscillator for passing radio frequency energy over a narrow frequency band centered about a predetermined local oscillator frequency separated by said predetermined intermediate frequency from said predetermined frequency of said carrier wave energy, said last-named means being coupled to said switch for actuation thereof into its first position when said local oscillator provides an output at a frequency within the pass band of said filter, and further means coupled to said switch for actuation thereof into its second position in the absence of output energy from said filter.

2. The combination as set forth in claim 1, wherein a receiving antenna is provided for supplying frequency modulated energy having said predetermined carrier frequency to the other of said mixer inputs, means for demodulating said carrier wave energy and supplying a modulation signal to said local oscillator that is a function of the modulation of the frequency modulated energy received by said antenna for providing a frequency modulated local oscillator output whose modulation is in phase with the modulation of the carrier wave energy supplied to said mixer.

3. The combination as set forth in claim 2, further comprising means including said filter for transmitting frequency modulated energy from said local oscillator with a carrier frequency corresponding to the center frequency provided by said local oscillator without transmitting any local oscillator energy at a frequency outside of the pass band of said filter.

4. An automatic frequency control system, comprising a mixer having first and second input circuits and an output circuit, a reflex klystron local oscillator coupled to one of said mixer input circuits for supplying local oscillator energy to be heterodyned with carrier wave energy supplied to the other of said mixer input circuits, said local oscillator having repeller electrode frequency control means for regulating the frequency thereof as a function of repeller electrode voltage, a pair of switch terminals, a voltage combining network connected to one of said switch terminals, an automatic frequency control circuit coupled between said mixer output circuit and said voltage combining network for establishing a frequency control voltage which is related to the departure of intermediate frequency energy at said mixer output circuit from a predetermined intermediate frequency, a sweep generator coupled to the other of said switch terminals for providing a scanning voltage for sweeping the frequency of said local oscillator over a predetermined range, said sweep generator further being coupled to said voltage combining network, a band pass filter coupled to the output of said local oscillator, and a switch arm coupled between the frequency regulating means of said local oscillator and the other of said switch terminals in the absence of an output from said local oscillator at a frequency within the pass band of said filter, and means coupled to said band pass filter for actuating said switch arm for contact with said one of said switch terminals in response to local oscillator energy passed by said filter.

5. In combination a mixer, a local oscillator for applying energy to said mixer for heterodyning with a received signal, said oscillator having voltage responsive means for controlling its frequency, sweep voltage generating means for applying a variable voltage to said voltage responsive means for scanning the frequency of said oscillator over a range of frequencies, a feedback loop that includes a switch, said loop being connected between the output of said mixer and said voltage responsive means for providing an error voltage for stabilizing the frequency of output energy from said mixer, a band pass filter connected to said local oscillator for passing local oscillator energy within a predetermined frequency band within said range of frequencies, means for actuating said switch for closing said feedback loop in response to energy passed by said filter, means for actuating said switch for opening said loop in the absence of energy passed by said filter, and a network disposed in said feedback loop for combining a variable reference voltage component from said sweep voltage generating means with an error voltage component provided in said feedback loop for applying a combined voltage to said voltage responsive means of said oscillator at the moment said feedback loop is closed.

References Cited in the file of this patent

UNITED STATES PATENTS

| | | |
|---|---|---|
| 2,434,294 | Ginzton | Jan. 13, 1948 |
| 2,490,591 | Himmer | Dec. 6, 1949 |
| 2,594,263 | Munster | Apr. 22, 1952 |
| 2,759,100 | Ratcliffe | Aug. 14, 1956 |
| 2,777,054 | Dahlberg | Jan. 8, 1957 |
| 2,825,804 | Rug | Mar. 4, 1958 |